United States Patent [19]

Dolby

[11] 3,846,719

[45] Nov. 5, 1974

[54] NOISE REDUCTION SYSTEMS

[76] Inventor: Ray Milton Dolby, c/o Dolby Laboratories, 590 Wandsworth Rd., London, England

[22] Filed: Sept. 13, 1973

[21] Appl. No.: 397,159

Related U.S. Application Data

[63] Continuation of Ser. No. 173,261, Aug. 19, 1971, abandoned.

[52] U.S. Cl. .................... 333/14, 179/1 P, 330/126, 333/17, 333/28 R, 333/70 R, 333/70 CR

[51] Int. Cl. ........ H03g 7/06, H03h 7/10, H04b 1/64

[58] Field of Search ......... 333/70 R, 70 CR, 12, 14, 333/17, 18, 28 R; 330/126, 124 R, 151; 328/167–169; 179/100.2 K, 1 D, 1 P

[56] References Cited

UNITED STATES PATENTS

| | | | |
|---|---|---|---|
| 2,413,263 | 12/1946 | Suter | 333/70 R X |
| 2,920,281 | 1/1960 | Appert et al. | 333/12 X |
| 3,281,723 | 10/1966 | Mercer | 333/18 |

*Primary Examiner*—James W. Lawrence
*Assistant Examiner*—Marvin Nussbaum
*Attorney, Agent, or Firm*—Dike, Bronstein, Roberts, Cushman & Pfund

[57] ABSTRACT

A noise reduction system comprising a compressor feeding an information channel and a complementary expander treating the output of the channel. The system is applicable to audio and visual signals using compressors and expanders with appropriately scaled frequency selective circuits which narrow the band in which compression and expansion take place as the signal level rises. Distortion and tracking accuracy problems are reduced by the use of compressor and expander configurations embodying a main signal circuit and a further signal circuit, the main circuit providing a first signal which has dynamic range linearity with respect to the input signal and the further circuit providing a second signal which is restricted to a small part of the dynamic range of the signal in the main circuit. The restriction may be effected by one or more variable filter means having a pass band which narrows to exclude large signal components from the compression or expansion action. The second signal is combined additively with the first signal for compressor operation and subtractively for expander operation. True complementarity is attainable by the use of a compressor and expander together to provide an overall noise reduction action without introducing defects into the signal being processed.

71 Claims, 14 Drawing Figures

NOISE REDUCTION SYSTEMS

This is a continuation of application Ser. No. 173,261, filed on Aug. 19, 1971, and now abandoned.

This invention relates to noise reduction systems of the type in which a signal is subjected to amplitude compression before being fed through transmission or recording and playback apparatus which introduces noise and thereafter to complementary expansion. For convenience the apparatus which introduces the noise will be called the "information channel". In audio systems the noise is usually hiss and hum and also rumble, clicks, crosstalk and so on. In video systems high frequency noise leads to a grainy picture.

Many noise reduction systems are known, including the use of pre-emphasis at the lower and upper parts of the audio range. This is of limited use because overloading must be avoided when the audio signal includes a substantial amount of energy in the high or low frequency ranges. Recording is sometimes effected on two channels, one recorded at a level up to 30dB above the other. On playback the high level channel is automatically selected for low level passages and vice versa but this technique is of limited applicability and necessarily uses two channels instead of one. Other systems use non-linear circuits but these introduce intermodulation distortion in audio systems. It is also known to control a low-pass filter automatically in response to signal level to filter out hiss during low-level passages only. In using compressors and expanders it is known to vary the degree of expansion on playback automatically in response to the signal level.

All of these prior proposals suffer from limited applicability or limited effectiveness or both and it is the object of the present invention to provide an improved system of general applicability and which enables the signal so to control the equalisation and compression characteristics as to load the information channel most efficiently over the whole signal range.

In a conventional limiter or compressor the operating law is determined by a variable gain device, together with its control circuits, through which the full signal passes. In the present invention on the other hand, the signal dynamics are split into two components: 1) An unaltered component which contributes mainly the high level signals and 2) a low level differential component from a limiter circuit. The overall compression characteristic is derived by adding the two components together.

This technique has several advantages. Distortion is reduced, since the limiter contribution is negligible at high levels. Tracking accuracy problems between compression and expansion are practically eliminated, since the compression law is largely determined by the readily controlled factors of the limiting threshold and the addition proportions of the two components. Thus a favourable property of the method is a relative insensitivity to errors in level between compression and expansion. The method is also advantageous under dynamic and transient signal conditions. In particular it is possible to hold overshoots to negligable values, thereby avoiding overloading of the information channel.

According to the present invention a signal compressor for use in a noise reduction system comprises a straight-through signal path and means for adding to the output thereof the output of a further path which includes means for amplifying the input signal and means for limiting the output of the further path to a fractional part of the maximum amplitude of the input signal to be treated by the compressor.

The effect of this is that, at high signal levels, the output of the compressor is substantially unchanged from the input signal, but at low levels the amplifier in the further path effects compression. The limiting means can be linear which means that the compressor is suitable for audio applications.

The signal expander is of course complementary to the compressor, the said further path being connected between the output of the expander and means for subtracting the output of the further path from the input signal.

If then the input signal to the compressor is $x$, the signal in the information channel is y and the output signal of the expander is $z$ we have $y = (1 + F_1)x$ and $z = y - F_2 z$ or $z = y/1 + F_2$ where $F_1$ and $F_2$ represent the transfer characteristics of the further paths in the compressor and expander respectively. Therefore we have $z = (1 + F_1/1 + F_2)\ x$ and if $F_1 = F_2$ $z = x$ as required. Note however that this result is obtained without the need for high amplification in the expander as in conventional feedback expanders in which the complete compressor would be enclosed within a feedback loop. Although $z = x$, noise introduced by the information channel is acted upon by the expander only to effect substantial attenuation thereof at low signal levels, e.g., 10dB noise reduction. The form of $F_1$ is that of a substantial multiplier at low signal levels falling off, so that the output of the further path is constant at higher levels or even making the output a decreasing function of $x$ at higher levels as later described.

Preferably the said further path has bandpass characteristics (which may of course be highpass or lowpass characteristics at the top and bottom of the overall frequency range respectively) so as to enable the noise reduction to be effected selectively in a particular part of the frequency spectrum subject say to hiss or hum or, in a video system, high frequency noise. Furthermore in most applications it is desirable to use a plurality of the further paths to deal selectively with different bands, so that high amplitude signals in one band do not prevent the noise reduction process in another band where there are low level signals.

In the case of a colour television signal significant reduction of moire patterns, as well as noise reduction, may be achieved if the further paths take account of the colour sub-carrier and preferably also its sidebands.

The expander may of course be used to improve the quality of a signal which was not previously subjected to the action of the compressor and there may be occasions when the compressor is used without the expander to provide certain equalisation characteristics. In general however a complete system will include both the compressor, feeding the information channel, and the expander fed by the information channel. In a modification of the invention two information channels are used, one for the straight-through signal from the compressor and one for the output of the further path thereof on the combined outputs of the several further paths. This is of use when it is desired in a compatible system to have the un-compressed signal separately available.

In a system in which phase is preserved, e.g., a video system, the output of the or each further path may be limited by a simple diode circuit which automatically shifts the filter cutoff frequency to narroww the pass band when the filter output rises above a certain level. In an audio system a linear limiter is used, being controlled by a smoothed signal to prevent the introduction of distortion. The linear limiter may then, however be followed by a non-linear limiter which is effective during the finite time taken by the smoothed signal to build up to prevent overloading in this interval, without introducing audible distortion however because of the shortness of the interval and because of the low amplitude of the limiter output as compared with that of the main channel. Alternatively the linear limiting action may be effected by the use of a variable cut-off frequency filter whose cut-off frequency is automatically shifted to narrow the passband when the filter output rises above a certain level.

The invention will be further described by way of example with reference to the accompanying drawings, in which:-

Figure 6:
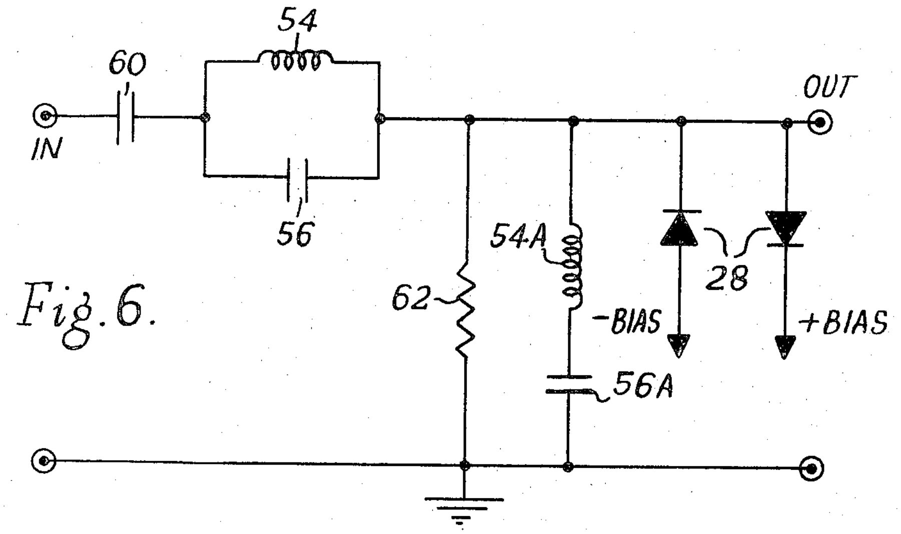
Figure 7:
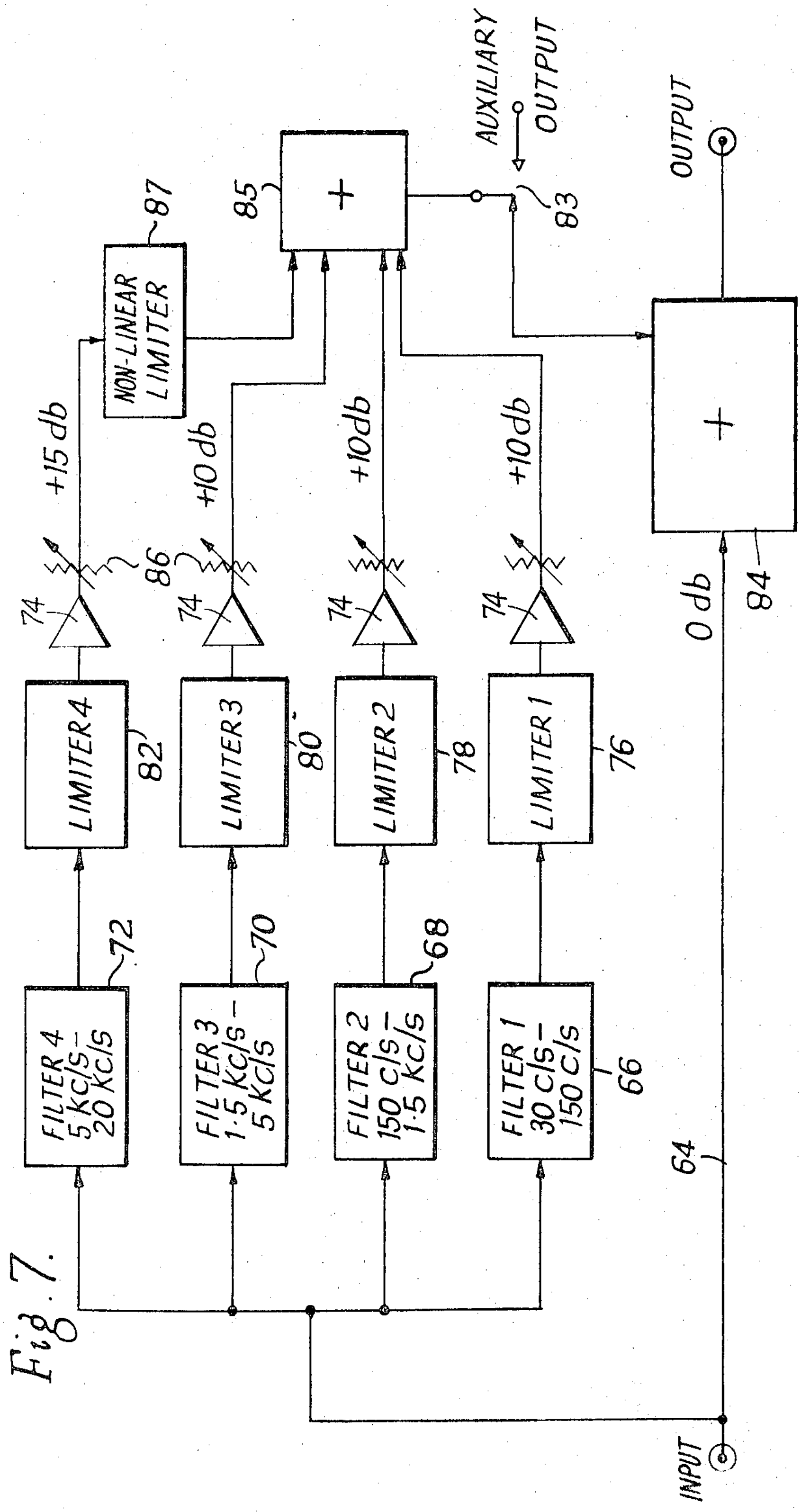
Figure 8:
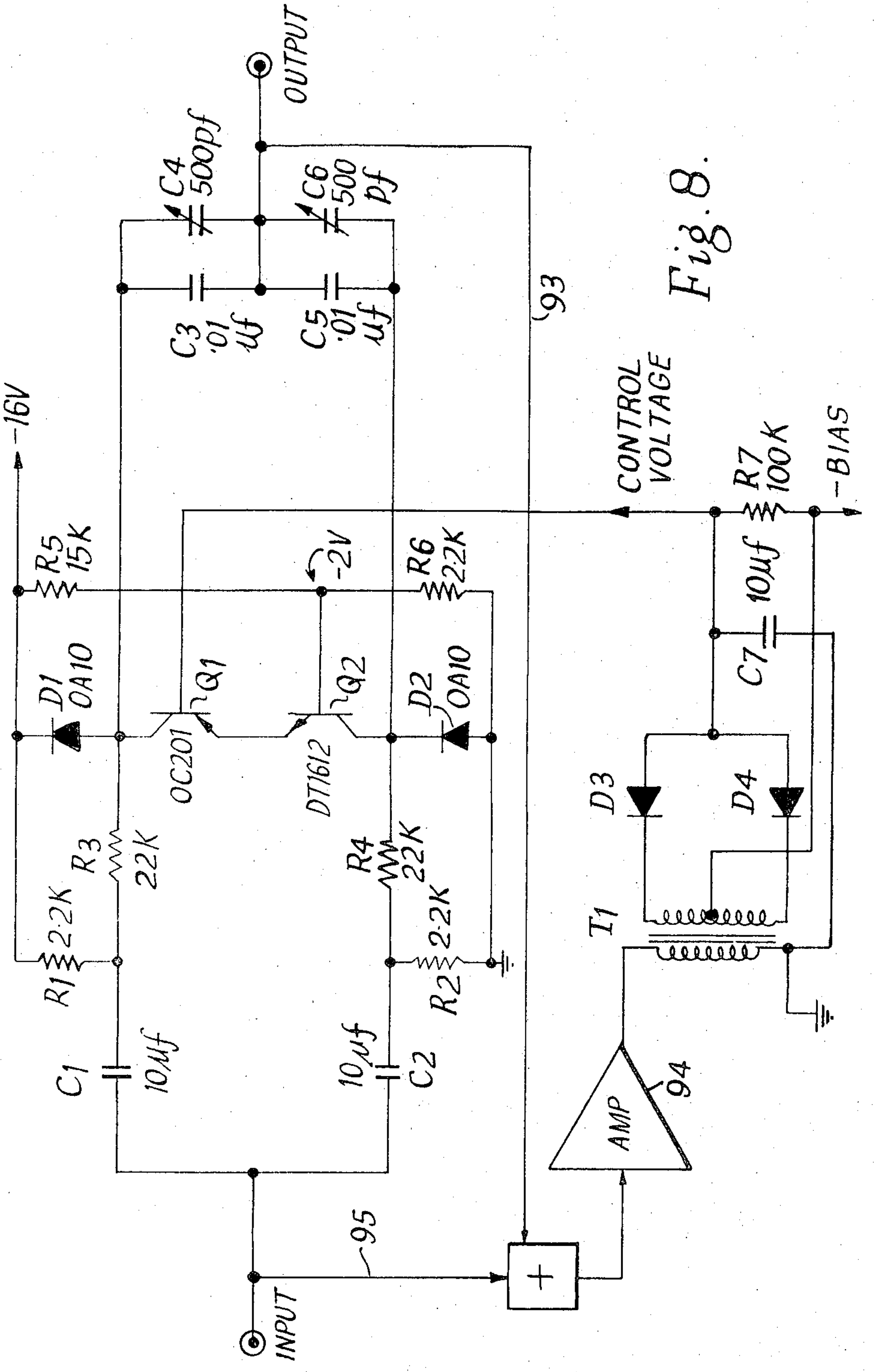
Figure 9:
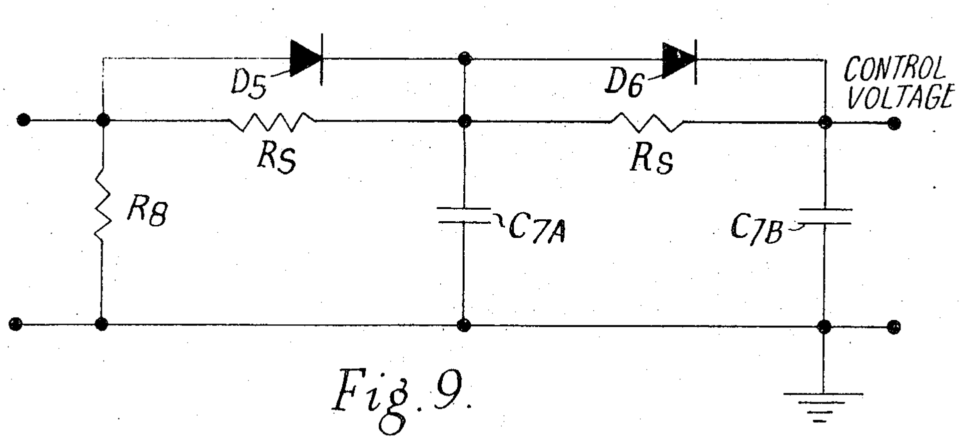
Figure 10:
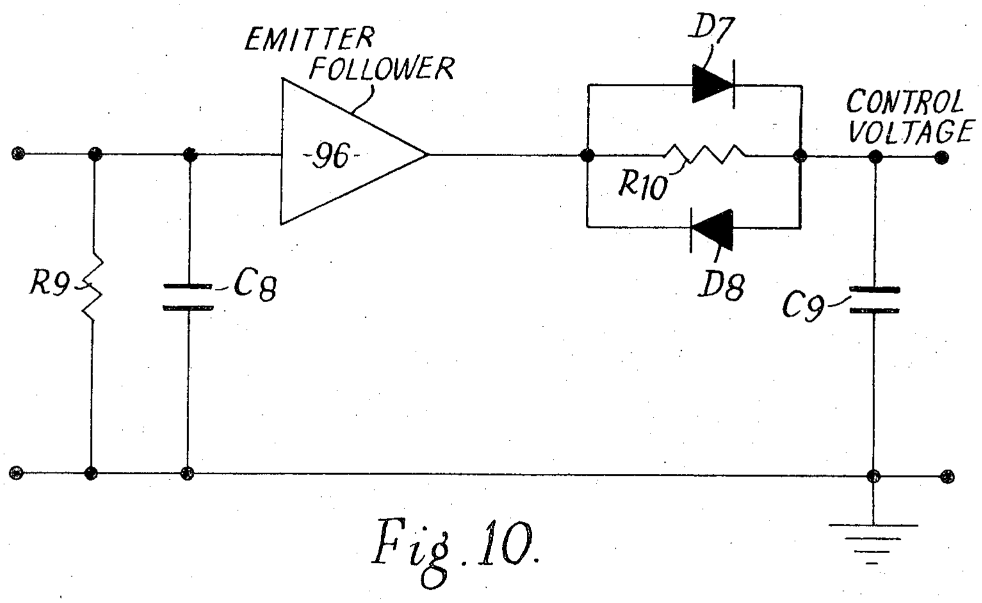
Figure 11:
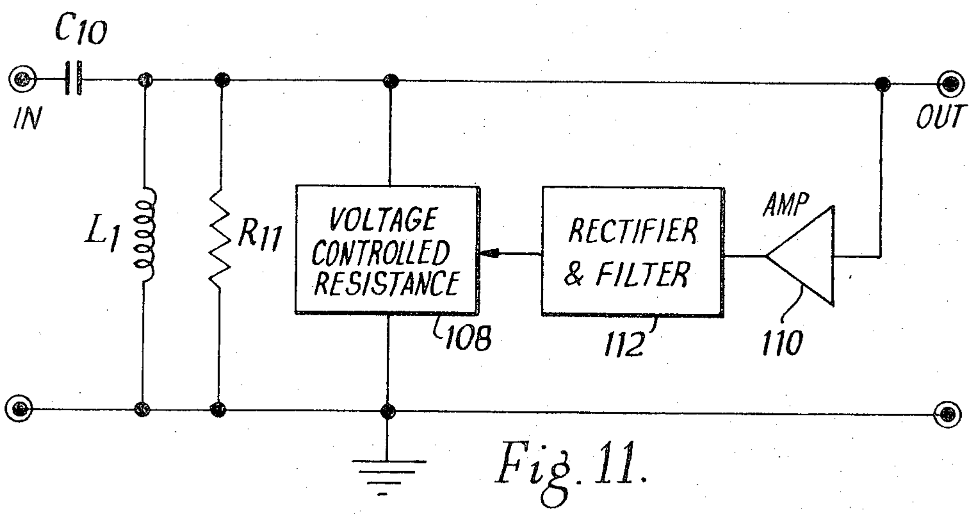
Figure 12A:
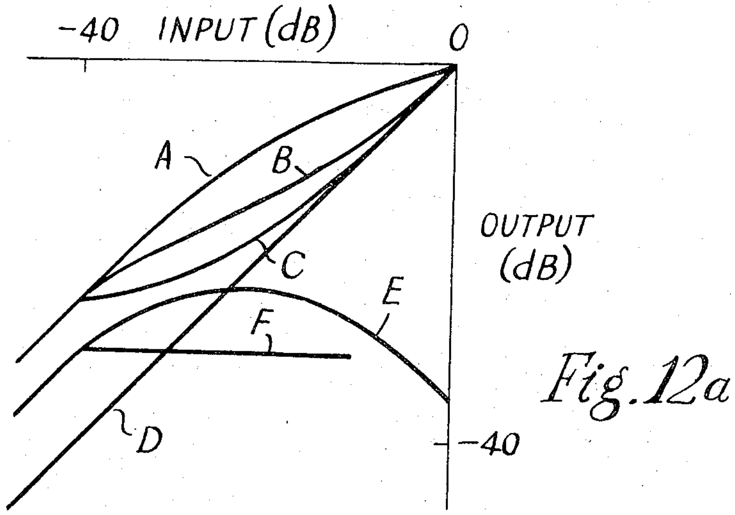
Figure 12B:
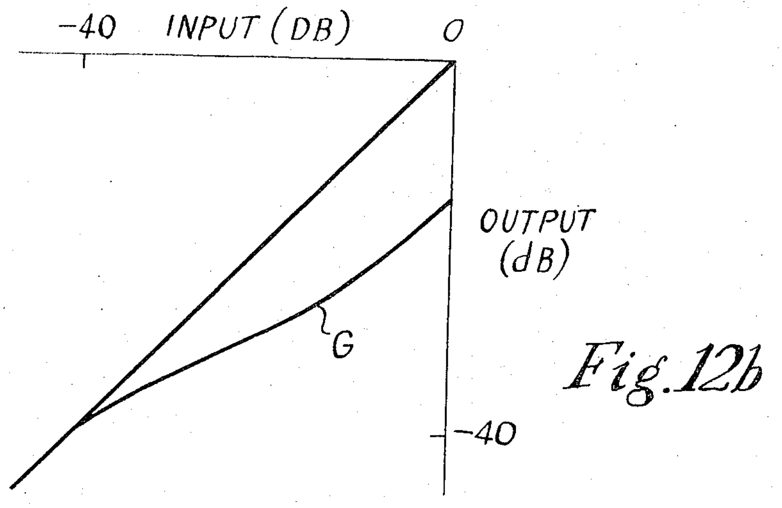
Figure 12C:
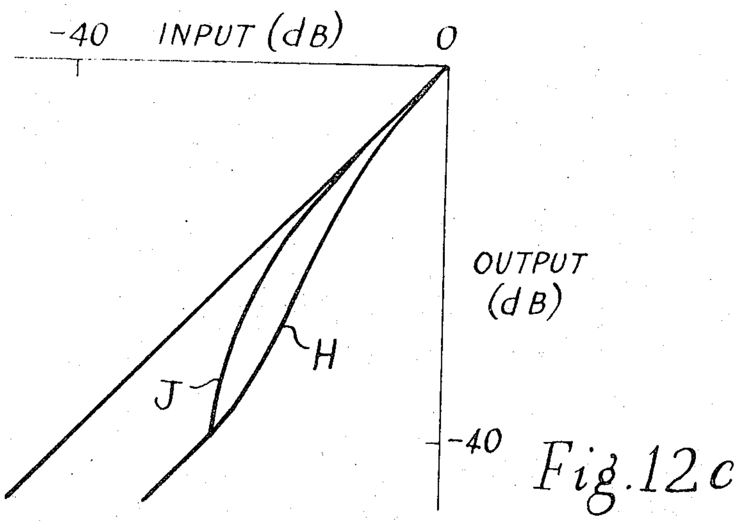

FIG. 6 is the circuit diagram of a modified filter and limiter circuit for use in a colour television system, FIG. 7 is a block diagram of an audio compressor, FIG. 8 is the circuit diagram of a limiter used in the compressor of FIG. 7, FIG. 9 shows a modification of FIG. 7, FIG. 10 shows another modification of FIG. 7, FIG. 11 is a diagram of a modified filter and limiter for the audio compressor, and FIG. 12 shows certain explanatory characteristic curves, curves relating to compressors being shown at (a), curves relating to compressors with attenuation at (b) and curved relating to expanders at (c).

Figure 1:
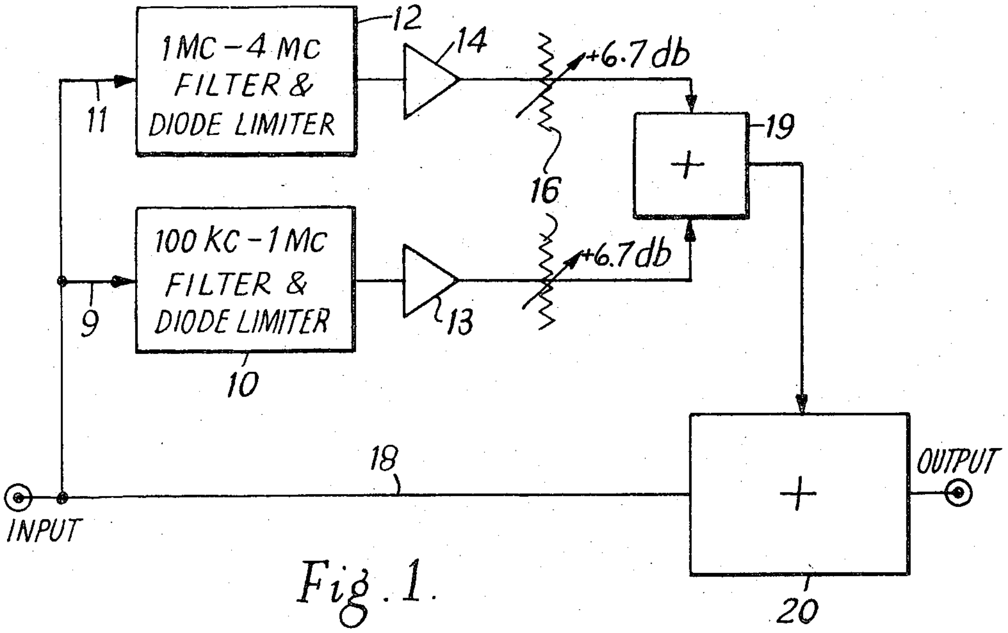
FIG. 1 is a block diagram of a compressor for video signals.

Referring to FIG. 1 a video compressor is shown in which the signal in a straight-through path 18 is added in circuit 20 to the outputs of two further paths 9 and 11 provided for reducing noise (in conjunction with an expander) in the 100kc/s - 1mc/s and 1mc/s to 4mc/s bands respectively. The outputs of paths 9 and 11 are added in an adder 19 before being fed to the adder 20. Amplifiers 13 and 14 amplify the low level input signals 10dB, set by attenuators 16. Each path includes a combined filter (selecting the corresponding band) and limiter 10, 12 which prevents the output of the two further paths exceeding say 1 percent of the maximum input signal-level. At low signal levels the high frequency components at the compressor output will be 10dB up on the input level but at full input level the value of the added components will be only 2.16 percent of the peak to peak signal, so that negligible overshoot is introduced.

Figure 2:
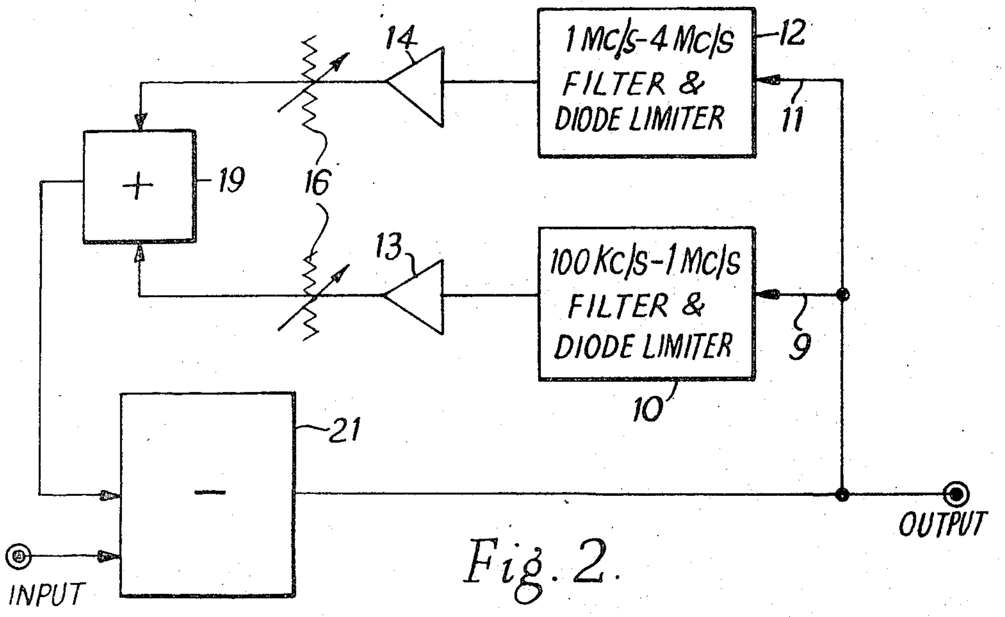
FIG. 2 is a block diagram of the complementary expander.

The expander shown in FIG. 2 restores the signal since the two signal paths 9 and 11 are now connected between the output and input of subtracting means 21. The paths 9 and 11 are identical to those in FIGS. 1 and 2. This expander circuit attenuates high frequency components at low signal levels in the high frequency bands and hence attenuates the high frequency noise which causes graininess. Of course the attenuation is not present when the high frequency signal level is high but the noise is not then noticeable because the picture gaininess is masked by the picture detail represented by the high frequency signal components. The same masking effect is reponsible for the success of the audio systems, later described, in removing perceptible noise. Two further paths 9 and 11 are shown by way of example in the expander and compressor of FIG. 1 and 2. If only a single path were used for the whole band of 100kc/s to 4 mc/s, high amplitude signals up to 1mc/s would frequently prevent the reduction of noise above 1mc/s.

In practice it is not necessary to have a separate amplifier in each path 9 and 11. A single amplifier common to both paths may precede the two filter and limiter circuits 10 and 12.

Figure 3:
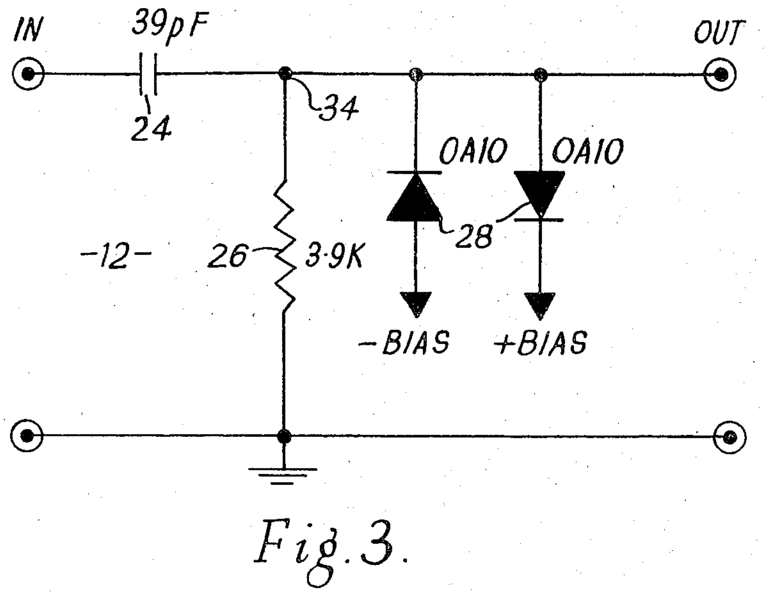
FIGS. 3 and 4 are circuit diagrams of two filter and limiter circuits used in the compressor and expander.
Figure 4:
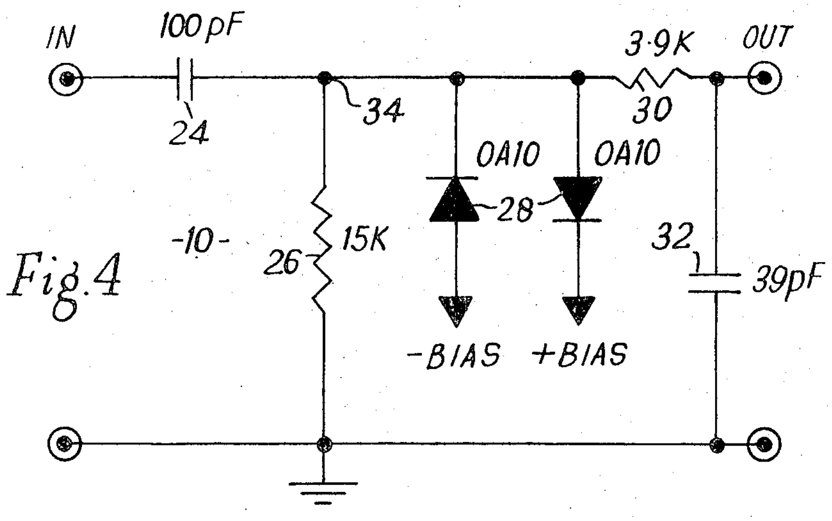

FIG. 3 shows the preferred circuit for the filter and limiter 12. A simple CR network 24, 26 gives high pass characteristics, i.e., above 1mc/s and diodes 28 limit the output to small excursions above and below ground. The circuit 10, FIG. 4 has an added RC circuit 30, 32 to define the 1mc/s upper cut-off and of course the components 24 and 26 have different values appropriate to a lower cut-off frequency of 100kc/s.

Figure 5:
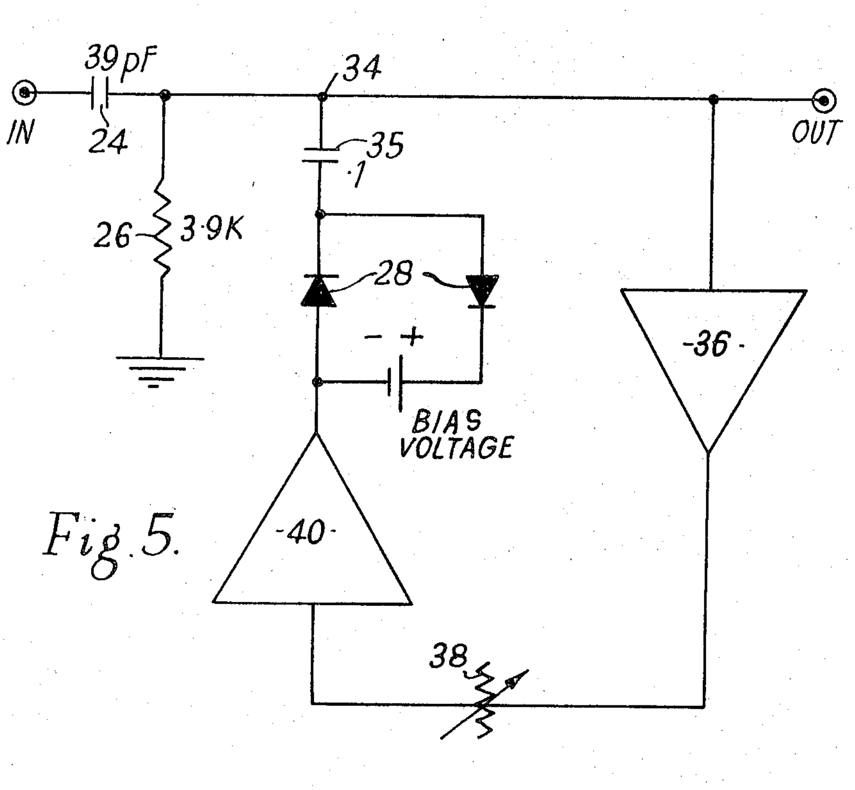
FIG. 5 shows a modified form of FIG. 3.

The diodes 28 are preferably high conductance germanium diodes to minimise the voltage drop thereacross, e.g., about 0.1 or 0.2 volts. Even so the input signal voltage must be at a high level if limiting is to be operative at say 1 percent of the maximum input. An input voltage of 40 volts peak to peak with a bias of a fraction of a volt is satisfactory. The modification shown in FIG. 5 reduces the drive requirement, as would be convenient in transistor circuits. The diodes 28 are connected to the filter output point 34 through a capacitor 35 and are returned to the output of a feedback amplifier chain comprising amplifier 36, gain-setting attenuator 38 and emitter follower 40. The voltage swing required at the input is reduced by the factor of the gain of the feedback loop, whose effect is to shift the limiting band in the opposite direction to changes in the input signal level.

It is important to notice the direct connection of the limiting diodes to the filter(s) at point 34, no buffer amplifier being interposed. The filter capacitor charging current is supplied mainly by the diodes for high amplitude transients. The recovery time of the circuit is therefore less than if a buffer were used, in which case the capacitor charging current would be supplied only by resistor 26. The filter components resume their normal, linear functions as soon as the transient has passed and the capacitor has been appropriately charged. The driver stage should be able to deliver sufficient current to charge the capacitor fully within about 0.1 microseconds after the passage of a full, peak to peak input step.

The particular circuits shown are suitable for a 405 line video signal. Obviously modifications must be made for other television standards and for use with video type instrumentation signals.

The expander may be used to clean up noisy video signals which have not however previously been subjected to the action of the compressor. Although this leads to loss of low level detail, the loss is surprisingly un-noticeable in normal viewing. When transmitting from a video recording for example, the operator may increase the gain of each path 9 and 11 sufficiently to reduce noise, introduced by a defective tape head say, to an acceptable level. It will also be appreciated that, when both compressor and expander are used, it is not necessary to match the characteristics of their respective further paths very closely.

The invention may be applied to colour video signals and is of particular advantage when recording colour in reducing moire patterns which arise from interaction between the colour sub-carrier and the f.m. carrier system of the video recorder.

The compression and expansion may be applied to the R, B and G signals individually, or better to the Y, I and Q signals or to the composite colour signal when, as will frequently be the case, component signals are not available separately. In all cases it is necessary to exclude the colour sub-carrier from each further path (to the extent of at least 50dB attenuation), otherwise the sub-carrier will choke the compressor and expander and make noise reduction impossible when component signals are being processed therefore, a low pas filter (cut-off at approximately 2mc/s) is required in each channel, suitable precautions being taken to avoid oscillation in the feedback loop used in the expander. Typically then, noise reduction can be obtained from say 100kc/s to 2mc/s in the R, B and G channels or from 100 kc/s to 2mc/s in the Y channel and from 100kc/s to the upper limits of the I and Q channels. A similar approach in the case of the composite signal will give noise reduction from 100kc/s to 2mc/s in the Y channel only but even this is of advantage since the spurious intermodulation products which give rise to moire patterns are contributed mainly by the Y channel.

If the cut-off frequency is raised to permit the passage of sub-carrier sidebands, say to within 400 kc/s of the sub-carrier frequency the noise reduction coverage will be increased but at the expense of introducing "dead time" (calculated to be of the order of 3 microseconds) whenever there is an abrupt change in the sub-carrier amplitude or phase. Dead time refers to time in which the output of the further path remains at the limiting level although the signal level has fallen below this level. Based on the 525 line N.T.S.C standard, noise reduction would be obtained in the Y channel from 100kc/s to 3.58mc/s minus 400kc/s = 3.18 mc/s, in the I channel from 400kc/s to 1.5mc/s and in the Q channel from 400kc/s to 500kc/s. The dead time means that noise reduction will not be good following large, abrupt colour transitions but the burst of noise is likely to be masked subjectively by the hue and saturation transition, as well as by the brightness change probably accompanying it.

The sideband choking effect may be compared with the previously described behaviour of the monochrome system in which a buffer amplifier is used between the filter circuit and the limiter. In neither case do the diodes enter into the filter network's readjustment to the new conditions imposed by the incidence of a transient. It was seen that when the diodes are allowed to interact with the filter the filter becomes non-linear with high amplitude transients and is forced to accommodate itself quickly to new conditions. This situation suggests that some analogous arrangement should be possible for response to a carrier and its sidebands.

The idealized behaviour could be obtained by a sub-carrier trap having a high Q (narrow bandwidth) when the colour sidebands and high frequency Y components have low levels, full noise reduction action being possible under these conditions. When the color sidebands and/or high frequency Y components exceed a predetermined level the Q of the trap would be lowered momentarily, thereby dissipating the energy introduced by the sidebands and not allowing its storage in reactive elements. As soon as the sideband energy is extinguished the Q of the circuit would be raised and the noise reduction action would be resumed.

One suitable circuit is shown in FIG. 6. In addition to a capacitor 60 and resistor 62 defining the lower frequency of the noise reduction band, as in FIG. 3, a parallel tuned sub-carrier trap consisting of inductor 54 and capacitor 56, is included in the series signal path and a series trap, consisting of inductor 54A and capacitor 56A, shunts the signal path. Either one of the two traps may be replaced by a non-tuned impedance. Although low level sideband components are transmitted to the output with undiminished level, the trap being unable to follow such changes while in linear operation, the circuit will be forced to accommodate itself to any large and abrupt change in the amplitude or phase of the carrier (appearance of sidebands) by the action of the diodes 28.

Noise reduction now covers the Y channel from 100kc/s upwards except for a sharp notch at the sub-carrier frequency. The I and Q channels are covered from a frequency depending on the bandwidth of the trap(s), e.g., 50kc/s, to their top ends.

The foregoing discussion has related primarily to the N.T.S.C and PAL type of system but much is applicable to the SECAM system. However some modifications would be necessary to cover the latter system since the sub-carrier is frequency modulated. For example the trap 54A, 56A of FIG. 6 could be replaced by a plurality of such traps in parallel and together covering the whole sub-carrier deviation band. Alternatively the f.m. sub-carrier could be tapped off, limited and fed back to cancel the sub-carrier in the composite signal in the further path of the compressor or expander.

Similar techniques to those discussed above may be used to deal with a.m. or f.m. carrier systems in instrumentation applications. In a multiple carrier system it is preferable to split the signal into separate bands, each with its own noise reduction system. A poorer alternative, in which several carriers would be treated by a single noise reduction system, would be to use a circuit such as that of FIG. 6 with a plurality of traps 54A, 56A tuned to the different carrier frequencies. In this case capacitor 60 and resistor 62 would be eliminated and the parallel resonant trap would be replaced by a resistor. Noise reduction would then cease in all channels whenever significant sideband components appeared in any one channel.

Turning now to audio signals, the only fundamental difference from video systems lies in the need for linear limiting owing to the lack of preservation of phase in audio information channels. A noise reduction path is necessary for a high frequency band, say 5kc/s to 20kc/s and usually for a low frequency band, say 30c/s to 150c/s. For a high quality system further paths are preferably provided to cover say 150c/s to 1.5kc/s and 1.5kc/s to 5kc/s. The resulting compressor circuit is shown in FIG. 7 and includes a straight-through path 64, adder 84, amplifiers 74 for the four paths, each with its attenuator 86, filters 66, 68, 70 and 72 for the four bands, separate, linear limiters 76, 78, 80 and 82 and further path combining means 85. Suggested gains for the paths are as follows.

| | | |
|---|---|---|
| Path 1 | 30c/s to 150c/s | 10dB |
| Path 2 | 150c/s to 1.5kc/s | 10dB |
| Path 3 | 1.5kc/s to 5kc/s | 10dB |
| Path 4 | 5kc/s to 20kc/s | 15dB |

These gains are of course only effective up to the levels imposed by the limiters 76 etc.

The corresponding expander is not shown as its construction will be immediately apparent by analogy with FIG. 2. Indeed as a practical matter, a single unit may be built with provision for switching or strapping connections to convert the unit to either a compressor or expander as required. The feedback connection required in the expander precludes the use of filters having fast changes in phase shift with frequency. The filters 66 etc. may be conventional, Each limiter may commence to act at about −40dB, full limiting being achieved at about −30dB and the contribution of any of the noise reduction paths at high signal levels is therefore negligable and cannot cause distortion or significant overshoot under transient signal conditions. As an optional feature however the output of each limiter may be caused to decrease as the level increases above −30dB as later described, the output falling to a negligible value at say −10dB. This feature is desirable in path 4 where the gain is 15dB and may be used in the other paths as well if flat response is required at high signal levels.

FIG. 12 shows compressor operating laws at (a), curve A being the law of a conventional compressor which operates on the full signal. Curve D represents the unaltered component of the straight-through path of the present invention and curve E represents the low level differential component from a limiter circuit. The characteristics D and E add to give the overall compression characteristic, B.

FIG. 8 shows suitable limiter circuit, the component values being appropriate to path 1, i.e., limiter 76.

The use of the exponential voltage-current characteristic of semiconductor diodes is a convenient way of providing a variable resistance which can readily be controlled by a d.c. bias current. Because in the present invention the limiters pass only low signal levels, distortion generated by the diodes is negligible.

Referring to FIG. 7, the dynamic resistances of diodes $D_1$ and $D_2$ (which may be any diodes having suitable high-slope low saturation voltage characteristics, such as germanium type 0A81) are controlled by the current passing through silicon transistors $Q_1$ and $Q_2$ (which should have low leakage currents and matched betas). Resistive voltage dividers are formed by $R_3$ and $D_1$ and by $R_4$ and $D_2$, the balanced connection cancelling out the signals produced by the control current. When $Q_1$ and $Q_2$ are in the cut-off condition the input signal will be passed to the output at essentially unaltered level, while if a control voltage is applied to $Q_1$, the dynamic resistance of the diodes will be reduced and the output signal will be attenuated.

Capacitors $C_1$, $C_2$, $C_3$, and $C_5$ are for coupling purposes only, having no frequency discrimination or time-constant effects. Resistors $R_1$ and $R_2$ tie the d.c. voltages of the outputs of the capacitors securely to the supply voltage and ground, respectively. Capacitors $C_3$ and $C_5$ add together the voltages of the two attenuation circuits, while capacitors $C_4$ and $C_6$ are adjusted to cancel out the control signal.

The amplifier 94 drives the full wave rectifier circuit $T_1$, $D_3$, and $D_4$, charging the smoothing capacitor $C_7$. Resistor $R_7$, in combination with $C_7$, produces a time constant of one second, which is suitable for the signals handled by the low frequency channel.

In the circuit as shown the onset of the limiting action will be quite sharp. By the use of a simple diode-resistor circuit between the emitters of $Q_1$ and $Q_2$ a smoother limiting characteristic can be obtained, which is of advantage for good tracking between the record and playback circuits in the region of the limiting threshold.

The essential signal to the amplifier 94 is that provided by feedback connection 93. The feed-forward connection 95 is optional and provides for the above-mentioned cut-off of the output at about −10dB.

In order to ensure that the compression characteristic in a particular band is determined only by the frequencies in that band, it is possible to introduce appropriate band-pass filters into each of the control amplifiers 94. This approach may be useful where the filters 66 etc. used on the inputs of the limiters do not provide sufficient rejection, sharper filters here being precluded by the feedback configuration used in the expander.

It is important to note that the use of separate circuits for the four different frequency bands does not merely allow noise reduction to take place in one band irrespective of the signal level in another band but the characteristics of each noise reduction path may be suited to the frequencies handled thereby. For example path 4 may have a release time constant as small as 2 milliseconds, (compared with times of the order of 0.3 to 7 sec. ordinarily associated with compression or limiting). When each time-constant is made suitable to the range of frequencies which it controls, the usual "swish" sound is absent.

The simple smoothing capacitor $C_7$ of FIG. 8 requires many cycles of the input waveform to discharge and makes the operation of the limiter sluggish. If the time constant is shortened to overcome this defect, ripple appears in the control voltage and distorts the compressed signal.

In order to overcome this problem the circuit shown in FIG. 9 may replace the capacitor $C_7$ and resistor $R_7$ in FIG. 8.

A suitable RC decay time constant ($R_8$ $C_7$) is chosen, and the capacitor $C_7$ is split into two parts $C_{7A}$ and $C_{7B}$, these being fed by two series resistors $R_8$. The series resistors are so chosen that with the capacitors the ripple voltage is reduced to the desired value. Unfortunately, the circuit then has an attack time which is far too great. However, when diodes $D_5$ and $D_4$ are connected in parallel with the resistors $R_8$, the fast rise time is restored without affecting the decay time. The diodes $D_5$ and $D_6$ are chosen to have voltage-current characteristics allowing effective filtering of the ripple component while being suitably conducting for larger amplitude excursions.

In the non-linear integrator described above there is a limit to the amount of filtering which can be achieved for a given decay time. Under these limiting conditions the ripple voltage will increase if the decay time is reduced. For the purpose of allowing a reduction in decay time a further refinement has been devised (FIG. 10). A pre-integrator consisting of resistor $R_9$ and capacitor $C_8$ is arranged to have the desired decay time-constant $R_9 C_8$; the pre-integrator can of course also be of the type shown in FIG. 18, yielding a smoother output wave without disadvantage. The output of the pre-integrator feeds an emitter follower 96, which serves as a low impedance driver for a further integrator circuit. Owing to the diodes $D_7$ and $D_8$ the capacitor $C_9$ is charged or discharged quickly, following the input wave, for large excursions. A fast rise time is hence preserved and the decay time is caused to follow that of the pre-integrator. But under equilibrium conditions the diodes are in an essentially non-conducting state, and the integrator $R_{10}C_9$ smoothes the wave to any degree desired.

A disadvantage of using a very short attack time is that the compression action is controlled by short transients and not by more extended and audibly more significant aspects of the signal. It is possible however in the present system to use an attack time of at least a millisecond if the linear limiter is followed by a conventional, non-linear limiter. Such a non-linear limiter 87 is shown in path 4 only of FIG. 7 (since it is an optional feature) and its effect is to clip symmetrically the output of the linear limiter 82 when a large suddenly applied signal passes therethrough because of the relatively long attack time. Overshoot is thereby limited to say 1 or 2dB with a full amplitude signal and the non-linear limiter does not introduce audible distortion, even on the most difficult types of programme material, such as piano, because the limiter output is small compared with the signal in the main path and because the distortion is of such short duration. With such long attack times being permissible it becomes possible to use low cost control elements such as electro-optical devices.

In a modified embodiment of the audio compressor or expander paths 2 and 3 in FIG. 7 are omitted and the limiting action in paths 1 and 4 is achieved by moving the top and bottom cut-off frequencies of the respective bands respectively down and up whenever the path output exceeds a certain level. Further description will be confined to path 4, the converse treatment in path 1 being apparent therefrom. Thus, at low levels at high frequencies, path 4 may boost signals from 2kc/s upwards. If a high amplitude signal occurs above this frequency, the cut-off frequency of the filter shifts upwards. FIG. 11 shows a suitable filter and limiter circuit for achieving this.

$C_{10}$, $L_1$ and $R_{11}$ form a conventional high pass filter. A voltage controlled resistance 108, which may be similar to the balanced diode circuit $D_1$, $D_2$ etc. shown in FIG. 8, is in parallel with $R_{11}$ and is biased so as normally to present high impedance. However the output signal is amplified at 110 and rectified and filtered by circuit 112 to provide a control signal for the resistance 108 such that its resistance falls as the signal amplitude increases. This shifts the filter cut-off frequency upwards and at the same time flattens the characteristic. Preferably the slope is 12dB/octave when resistance 108 is high impedance, to prevent incorrect operation being caused by high amplitude components below 2kc/s; but the slope may fall to 6dB/octave as the cut-off frequency rises without detriment.

The resistance 108 may of course take various other forms, such as Hall effect devices, reactance tubes, voltage controlled capacitances, or light controlled resistors. The time constants of the rectifier-filter circuit 112 may be of the order of 100 milliseconds for the high frequency channel and a few tenths of a second for the low frequency channel.

Methods of providing a complete cut-off effect are possible as in the case of the limiter of FIG. 8. Nevertheless, one method would be to monitor the a.c. current passing through the voltage controlled resistance 112. When the current exceeds a certain value a voltage derived from this current would be fed into the control circuit, which would thereby lower the resistance still further. The output signal would then be cut off, disabling the voltage feedback connection until the input voltage or frequency distribution has changed in such a way as to reduce the sampled current.

Other refinements might include the introduction of a simple frequency discriminating network either in the control amplifier 110 or in the output of the circuit of FIG. 11 for the purpose of lowering the threshold voltage for very high or very low frequencies, which may be necessary in order to prevent overloading of some types of highly equalized recording system.

The audio compressors and expanders described above may be used in many fields, including tape recording, disc recording, motion picture sound recording, radio relay systems and telephone networks. In particular master tapes can be produced with a high S/N ratio, even after repeated dubbing, and the cost of either master tapes or pre-recorded tapes could be reduced by making it possible to use a higher packing density.

A system based on the compressor of FIG. 7 with its corresponding expander has been tested under the most stringent conditions and does not introduce any detectable degradation of programme material of the most difficult kinds.

Related devices or systems based on the principles of the present invention may be mentioned.

A full band noise reduction system may be used in some cases. This could take the form of path 4 of FIG. 7, omitting the filter 72, using curves B and H in FIG. 12 in recording and playback respectively. In other cases full coverage of the audio frequency band may not be needed and a single path with an appropriate filter to deal with say hiss or rumble may be used. A narrow band filter may be used to deal with noise at a specific frequency, such as hum or a whistle, and the filter may be made tunable if required. Such a narrow band path may be used in addition to the paths providing full band coverage, as in FIG. 7. The narrow band path can then function even when the action of the broad band path encompassing the narrow path is blocked by high level signals. Where the noise level is high and of a wideband nature it may be necessary to use a large number of narrow band paths.

The use of separate information channels for the direct signal and the signals from the noise reduction path(s) has been briefly mentioned. In effect, in FIG. 7, this means removing the adding circuit 84 from the compressor to the expander and is illustrated schematically by showing a switch 83 for feeding the output of the adder 85 to an auxiliary output for transmission or recording in a channel parallel to that of the straight-through signal. This has application in compatible VHF transmissions, compatible monaural disc recordings (the two channels being recorded separately by the techniques used in stereo recording), and compatible tape recordings. The noise reduction channel can then be recorded at a higher level on a narrow track outside the region of the normal head which will reproduce only the direct signal. For noise reduction operation an additional head scans the narrow track or an extra wide head scans both this and the direct signal track.

For non-critical applications however the transmitted or recorded signal need not be compatible, it being possible to dispense with the expander provided a simple passive network is used to correct the bass and treble boost affectively introduced by the compressor. For the parameters used in the present system the network provides a 6dB/octave roll-off starting at 100c/s at the bass end and 3kc/s at the treble end.

The invention also facilitates the reduction of distortion, especially high frequency distortion in disc recording in that a lower recording level may be used without sacrificing signal to noise ratio, recording being in accordance with curve G in FIG. 12(*b*). Even at low frequencies it may be advantageous to use the invention to permit a lower recording level and hence a higher density of information, as by a finer groove pitch for example in disc recording.

For reducing traffic or turntable rumble an expander may be used with a single noise reduction path including a low pass (80c/s) filter and both linear and non-linear limiters as in FIG. 8. However a more abrupt expansion law is used, as in curve J in FIG. 12(*c*).

When low frequency signals are absent the system yields an attenuated low frequency response, the limiting threshold being set at a value a little higher than the rumble amplitude. If they are present at all, low frequency signal components will have amplitudes considerably higher than the limiting threshold and will therefore be passed with little or no attenuation.

Though the rumble-reducing expander does not presuppose the use of a compressor, the corresponding compression law to J is shown at C in FIG. 12(*a*) and is obtained by adding to the straight-through characteristic D a noise reduction path characteristic F. Characteristic F results from a higher loop gain and a sharper limiting threshold than in the case of the curve E appropriate to the circuit of FIG. 8. In passing, the turn-down of curve E at higher signal levels is the result of the feed-forward control in FIG. 8.

An expander may also be used, without a compressor for hiss reduction but this matter is not so clear-cut as the case of rumble reduction, since, unlike low frequencies (which are fundamentals), high frequency signal components (which are harmonics) may have any amplitude whatever. To avoid noticeable alterations of the frequency response it is therefore necessary in the high frequency case to derive the control signals for the limiter from lower frequency fundamentals, which can be used as a likely indicator of the presence of high frequency components.

A hiss reduction system can be arranged in the same way, following curve J, as the rumble reduction system, except for filters. In the filter position shown in FIG. 7 a 2,000 c/s high pass filter, for example, can be used, the output of this filter containing sufficient fundamentals to give a rough indication of the presence of higher harmonics. A 5,000 c/s filter would then be interposed between the linear limiter and the non-linear limiter, this filter controlling the frequency range of the hiss reduction action. In other applications it may be desirable to make the band selected for deriving the rectified and smoothed control signal narrower than the band acted up on by the filter and limiters in the further path.

In an alternative arrangement in which phase problems are less likely, the 5,000 c/s signal filter can be placed in the "filter" position of FIG. 7, and the control voltage for the limiter can be derived from a sharp 2,000 c/s filter fed in parallel with the signal filter or from the input.

For the reduction of discrete frequency noise, without the use of a compressor, bandpass filter and limiter channels following curve J of FIG. 12(*c*) are provided for each interfering frequency, each having an appropriate threshold setting. When a signal appears at one of the noise frequencies the noise reduction action is momentarily blocked, but the interference is then effectively masked by the signal.

In certain applications it is convenient to have some automatic way of closing down recording or transmission channels which are momentarily unused. The required automatic attenuation action can be obtained with an operating law as shown in FIG. 12(*c*) curve J, no filter being used. The limiter threshold would be set to a value just above the noise level of the system, or at any other level above which the signal is deemed to be significant. The most valuable property of such an automatic attenuator is that it would have an instantaneous attack time with no distortion of the initial wavefront.

In some recording applications it is convenient to be able to boost the high and low frequencies during low level passages according to the Fletcher-Munson curves, in order to compensate for the low level frequency response characteristics of the ear. This operation can be accomplished, using a suitable filter, with a compressor having a law of the type shown in FIG. 12(*a*) curve B, but the exact shape used would have to be chosen, together with the response of the filter, to give the best overall fit to the Fletcher-Munson curves. It would also be possible to obtain the required characteristics by means of separate low and high frequency channels; this approach would be preferably from the point of view of optimising the decay time constants.

Although it is preferred to construct the expanders in the manner hereinbefore disclosed, it will be appreciated that an expander may be formed in the conventional way by including a complete compressor in the feedback loop of a high gain feedback amplifier. This form of expander is not specifically claimed hereinafter since it consists merely of a compressor according to the invention connected in an otherwise known circuit.

What is claimed is:

1. A signal processing system which responds to an input signal to produce an output signal with modified dynamic range, said signal processing system comprising a main signal circuit responsive to the input signal to provide in a specified frequency band a first signal with dynamic range linearity relative to the input signal;

means in the main signal circuit for combining linearly a second signal in said specified frequency band with the first signal to provide the output signal; and a further signal circuit responsive to a signal from the main signal circuit for providing the second signal such as to affect the level of the output signal significantly at very low input signal levels, the further signal circuit including one or more variable gain elements with outputs thereof which are substantially free of non-linear distortion at all frequencies in said specified frequency band, the outputs of said variable gain elements being coupled to the output of the further signal circuit to provide the second signal, said variable gain elements having the characteristics that below predetermined low levels there is no gain reduction of signals in said further signal circuit and above said low levels there is substantial gain reduction, the outputs of said variable gain elements and the second signal produced thereby being limited to levels corresponding to small fractional parts of the maximum signal level applied to the further signal circuit, where said small fractional parts are in the region of an order of magnitude less than unity, or smaller.

2. A signal processing system according to claim 1 wherein said further signal circuit is responsive to a signal derived from said input signal to provide said second signal, and said combining means so combine said first and second signals that said second signal boosts said first signal, whereby said system operates as a dynamic range compressor.

3. A signal processing system according to claim 1 wherein said further signal circuit is responsive to a signal derived from said output signal to provide said second signal, and said combining means so combine said first and second signals that said second signal bucks said first signal, whereby said system operates as a dynamic range expander.

4. A system according to claim 1 wherein said further signal circuit includes filter means for restricting the frequencies passed thereby to a part of said specified frequency band.

5. A system according to claim 4 wherein there is a plurality of further signal circuits.

6. A system according to claim 1 wherein said further signal circuit further includes means for restricting the amplitudes of transient overshoots in said second signal.

7. A system according to claim 1 wherein said further signal circuit includes control means for rectifying and smoothing at least one signal derived from said system to produce a control signal or controlling the limiting action of said variable gain elements.

8. A system according to claim 7 wherein said smoothing means comprise a first smoothing circuit; and a second smoothing circuit coupled to said first smoothing circuit;

said first smoothing circuit having a relatively fast response time; and said second smoothing circuit having a relatively slow response time under substantially uniform signal level conditions and a relatively fast response time under dynamic signal conditions.

9. A system according to claim 8 wherein said second smoothing circuit is coupled to said first smoothing circuit through an amplifier having a high input impedance and a low output impedance.

10. A system according to claim 8 wherein said second smoothing circuit includes a series resistor; and a shunt capacitor; and at least one diode means in parallel with said resistor, said diode means having a polarity arranged to permit rapid charging of said capacitor.

11. A system according to claim 7 wherein at least one signal is derived from the output of said further signal circuit.

12. A signal processing system according to claim 1 wherein said main signal circuit is such that said first signal is instantaneously proportional to said input signal.

13. A signal processing system according to claim 1 wherein said main and further signal circuits are parallel signal paths.

14. A signal processing system according to claim 1 wherein said substantial gain reduction results in the amplitude of said second signal rising, peaking, and then falling as a function of signal level applied to the further signal circuit.

15. A system according to claim 2 wherein there is a plurality of further signal circuits which operate in a plurality of frequency bands covering the audio spectrum and in which the said boosting action is approximately 10 dB.

16. A system according to claim 3 wherein there is a plurality of further signal circuits which operate in a plurality of frequency bands covering the audio spectrum and in which the said bucking action is approximately 10 dB.

17. A signal compressor which responds to an input signal to produce an output signal with reduced dynamic range, said signal compressor comprising a main signal path responsive to the input signal to provide in a specified frequency band a first signal which is instantaneously proportional to the input signal;

means in the main signal path for combining additively a second signal within said specified frequency band with the first signal to provide the output signal; and a further signal path responsive to the input signal to provide the second signal such as to increase the level of the output signal significantly at very low input signal levels, the further signal path including filter means for restricting the second signal to part of said specified frequency band; and one or more variable gain elements with outputs thereof which are substantially free of non-linear distortion at all frequencies in said specified frequency band, the outputs of said variable gain elements being coupled to the output of the further signal path to provide the second signal, said variable gain elements having the characteristics that below predetermined low levels there is no gain reduction of signals in said further signal path and above said low levels there is substantial gain reduction, the outputs of said variable gain elements and the second signal produced thereby being limited to levels corresponding to small fractional parts of the maximum signal level applied to the further signal path, where said small fractional parts are in the region of an order of magnitude less than unity, or smaller, the second signal increasing the level of the output signal insignificantly at maximum input signal level.

18. A signal expander which responds to an input signal to produce an output signal with increased dynamic range, said signal expander comprising a main signal path responsive to the input signal to provide in a specified frequency band a first signal which is instantaneously proportional to the input signal;

means in the main signal path for combining subtractively a second signal within said specified frequency band with the first signal to provide the output signal; and a further signal path responsive to the output signal to provide the second signal such as to decrease the level of the output signal significantly at very low input signal levels, the further signal path including filter means for restricting the second signal to part of said specified frequency band; and one or more variable gain elements with outputs thereof which are substantially free of non-linear distortion at all frequencies in said specified frequency band, the outputs of said variable gain elements being coupled to the output of the further signal path to provide the second signal, said variable gain elements having the characteristic that below predetermined low levels there is no gain reduction of signals in said further signal path and above said low levels there is substantial gain reduction, the outputs of said variable gain elements and the second signal produced thereby being limited to levels corresponding to small fractional parts of the maximum signal level applied to the further signal path, where said small fractional parts are in the region of an order of magnitude less than unity, or smaller, the second signal decreasing the level of the output signal insignificantly at maximum input signal level.

19. A method of processing an input signal to produce an output signal with reduced dynamic range comprising the steps of combining additively first and second signal components to produce said output signal, providing said first signal component in the form of a signal which is substantially proportional to said input signal;

providing said second signal component by filtering and limiting a signal derived from said input signal by one or more filters and by one or more variable gain elements which contribute negligible non-linear distortion to the signals handled thereby and which have the characteristics that below predetermined low levels there is no gain reduction of signals handled thereby and above said low levels there is substantial gain reduction, said second signal component produced thereby being restricted to a part of the frequency band occupied by said first signal component and being limited to a small fractional part of the maximum amplitude of said first signal component, where said small fractional part is in the region of an order of magnitude less than unity, or smaller.

20. A method of processing an input signal to produce an output signal with increased dynamic range comprising the steps of combining subtractively first and second signal components to produce said output signal, providing said first signal component in the form of a signal which is substantially proportional to said input signal;

providing said second signal component by filtering and limiting a signal derived from said output signal by one or more filters and by one or more variable gain elements which contribute negligible non-linear distortion to the signals handled thereby and which have the characteristic that below predetermined low levels there is no gain reduction of signals handled thereby and above said low levels there is substantial gain reduction, said second signal component produced thereby being restricted to a part of the frequency band occupied by said first signal component and being limited to a small fractional part of the maximum amplitude of said first signal component, where said small fractional part is in the region of an order of magnitude less than unity, or smaller.

21. A signal processing system which responds to an input signal to produce an output signal with a modified dynamic range, said signal processing system comprising a main signal circuit responsive to the input signal to provide in a specified frequency band a first signal having dynamic range linearity relative to the input signal; and means in the main signal circuit for combining linearly a second signal within said specified frequency band with the first signal to provide the output signal; and a further signal circuit responsive to a signal derived from the main signal path for providing the second signal such as to effect the level of the output signal significantly at very low input signal levels, the further signal circuit including variable filter means, the band pass of which narrows automatically to restrict, above a low-level threshold, said second signal to a level corresponding to a small fractional part of the maximum signal level applied to the further signal circuit, where said small fractional part is in the region of an order of magnitude less than unity, or smaller.

22. A signal processing system according to claim 21 wherein said further signal circuit is responsive to a signal derived from said input signal; and said signal combining means so combines said first and said second signals that said second signal boosts said first signal, whereby said system operates as a dynamic range compressor.

23. A signal processing system according to claim 21 wherein said further signal circuit is responsive to a signal derived from said output signal; and said signal combining means so combines said first and said second signals that said second signal bucks said first signal, whereby said system operates as a dynamic range expander.

24. A system according to claim 21 wherein there is a plurality of said further signal circuits.

25. A signal processing system according to claim 21 wherein said variable filter means has the characteristic that said second signal is substantially free of non-linear distortion.

26. A system according to claim 25 wherein said further signal circuit further includes means for restricting the amplitudes of transient overshoots in said second signal.

27. A system according to claim 25 wherein said variable filter means further includes control means for rectifying and smoothing at least one signal derived from said system to produce a control signal; and means responsive to said control signal to control said restricting action.

28. A system according to claim 27 wherein said smoothing means comprise a first smoothing circuit having a relatively fast response time; and a second smoothing circuit coupled to said first smoothing circuit, said second smoothing circuit having a relatively slow response time under substantially uniform signal level conditions and a relatively fast response time under dynamic signal conditions.

29. A system according to claim 21 wherein said variable filter means includes capacitance means the first end of which is coupled to the input of said filter means and the second end of which is coupled to the output of said filter means; and diode means connected between reference points and said output and arranged to conduct when the signal at said output exceeds a predetermined level whereby the frequency response of said filter means is controlled by the dynamic impedance of said diode means, thereby to provide said restriction of said second signal.

30. A system according to claim 29 and further including an amplifier responsive to the output of said filter means for producing an output voltage for controlling the voltage of said reference points.

31. A system according to claim 21 wherein said input signal is a carrier signal having one or more sideband signals, wherein said variable filter means includes at least one rejection filter circuit for rejecting said carrier signal and for attenuating said sideband signals.

32. A system according to claim 21 wherein said input signal is a broad band signal in combination with a carrier signal having one or more sideband signals, said further signal circuit further including a fixed rejection for rejecting said carrier signal and for attenuating said sideband signals.

33. A system according to claim 21 wherein said variable filter means includes a parallel resonant network means the first end of which is coupled to the input of said filter means and the second end of which is coupled to the output of said filter means; and diode means connected between reference points and said output and arranged to conduct when the signal at said output exceeds a predetermined level, whereby the frequency response of said filter means is controlled by the dynamic impedance of said diode means, thereby to provide said restriction of said second signal.

34. A signal compressor which responds to an input signal to produce an output signal with reduced dynamic range, comprising means responsive to said input signal to produce a first signal component which has dynamic range linearity relative to said input signal, means for so combining linearly said first component and a second signal component that said second component boosts said first component to produce said output signal, said second component increasing the level of said output significantly at low input signal levels, and variable filter means operative to produce said second component by filtering a signal derived from said input signal, the band pass of said filter means narrowing automatically, to restrict, above a low-level threshold, said second component to part of the frequency band occupied by said first component and to a small fractional part of the maximum amplitude of said first component, where said small fractional part is in the region of an order of magnitude less than unity, or smaller.

35. A signal expander which responds to an input signal to produce an output signal with increased dynamic range, comrpising means responsive to said input signal to produce a first signal component which has dynamic range linearity relative to said input signal, means for so combining linearly said first component and a second signal that said second component bucks said first component to produce said output signal, said second component reducing the level of said output signal significantly at low input signal levels, and variable filter means operative to produce said second component by filtering a signal derived from said output signal, the band pass of said filter means narrowing automatically, to restrict, above a low-level threshold, said second component to part of the frequency band occupied by said first component and to a small fractional part of the maximum amplitude of said first component, where said small fractional part is in the region of an order of magnitude less than unity, or smaller.

36. A method of processing an input signal to produce an output signal with reduced dynamic range comprising the steps of combining linearly first and second signal components so that said second component boosts said first component to produce said output signal, providing said first signal component in the form of a signal which has dynamic range linearity relative to said input signal;

providing said second signal component by filtering a signal which is derived from said input signal and by automatically narrowing the band pass of said filtering action to restrict, above a low-level threshold, said second signal component produced thereby to a part of the frequency band occupied by said first signal component and to a small fractional part of the maximum amplitude of said first signal component, where said small fractional part is in the region of an order of magnitude less than unity, or smaller.

37. A method of processing an input signal to produce an output signal with increased dynamic range comprising the steps of combining linearly first and second signal components so that said second component bucks said first component to produce said output signal, providing said first signal component in the form of a signal which has dynamic range linearity relative to said input signal;

providing said second signal component by filtering a signal which is derived from said output signal and by automatically narrowing the band pass of said filtering action to restrict, above a low-level threshold, said second signal component produced thereby to a part of the frequency band occupied by said first signal component and to a small fractional part of the maximum amplitude of said first signal component, where said small fractional part is in the region of an order of magnitude less than unity, or smaller.

38. A signal processing system for processing a system input signal to and an information signal from an information channel to produce a system output signal substantially identical to said system input signal, said signal processing system comprising:

a signal compressor for processing said system input signal to produce an intermediate signal for said information channel, said signal compressor including a first main signal circuit responsive to said system input signal and including means for providing in a specified frequency band a first signal having dynamic range linearity relative to said system input signal;

first combining means for linearly combining at least two signals to produce said intermediate signal, one signal of which is said first signal;

a first further signal circuit responsive to a signal derived from said first main signal circuit for producing a second signal such as to increase the level of said intermediate signal significantly at very low input signal levels, said first further signal circuit including first limiting means for limiting, above a low-level threshold, said second signal to an amplitude corresponding to a fractional part of the maximum amplitude of the signal applied to said first limiting means; and means for applying said second signal to said first combining means; and a signal expander for processing said information signal from said information channel to produce said system output signal, said signal expander including a second main signal circuit responsive to said information signal and including means for providing in a specified frequency band a third signal dynamic range linearity relative to said information signal;

second combining means for linearly combining at least two signals to produce said system output signal, one signal of which is said third signal;

a second further signal circuit coupled to said second main signal path and responsive to a signal derived from said second main signal circuit for producing a fourth signal such as to decrease the level of the system output signal significantly at very low information signal levels, said second further signal circuit including second limiting means for limiting, above a low-level threshold, said fourth signal to an amplitude corresponding to a fractional part of the maximum amplitude of the signal applied to said second limiting means; and means for applying said fourth signal to said second combining means, wherein the characteristics of said first further signal circuit are substantially identical to those of said second further signal circuit whereby the operation of said signal compressor and said signal expander are complementary, and said system output signal is substantially identical to said system input signal.

39. A noise reduction system according to claim 38 wherein said first further signal circuit is responsive to a signal derived from said system input signal; and said second further signal circuit is responsive to a signal derived from said system output signal.

40. A method of effecting noise reduction for a signal storage or transmission channel wherein an input signal is converted to an output signal, comprising the steps of:

providing a first signal component which, in a specified frequency band, has dynamic range linearity relative to said input signal, providing a second signal component within said band by restricting, above a low-level threshold, a signal derived from said input signal to a small fractional part of the maximum amplitude of said first signal component, combining linearly said first and second components so that said second component boosts said first component to produce a third signal, said second component increasing the level of said third signal by a given proportion at very low input signal levels, feeding said third signal to said channel and recovering a fourth signal from said channel, providing a fifth signal component which, within said band, has dynamic range linearity relative to said fourth signal, providing a sixth signal component within said band by restricting, above a low-level threshold, a signal derived from said output signal to a small fractional part of the maximum amplitude of said fifth signal component, combining linearly said fifth and sixth component decreasing the level of said output signal by a given proportion at very low fourth signal levels, the two said small fractional parts being in the region of an order of magnitude less than unity, or smaller, whereby said second component increases the level of said third signal by a small fraction of said given proportion at high input signal levels at which high levels said third signal is approximately equal to said first component, whereby said sixth component decreases the level of said output signal by a small fraction of said given proportion at high fourth signal levels at which high levels said output signal is approximately equal to said fifth component, the two said restricting actions being substantially comparable and the said boosting and bucking actions being in reciprocal proportions such that, within said band, said output signal is substantially proportional to said input signal, except for the effects within said band of channel non-proportionalities between said third and fourth signals and whereby low level channel noise within said band appears at reduced level in said output signal when said output signal level is low.

41. A system according to claim 27 wherein said at least one signal is derived from the output of said further signal circuit.

42. A signal processing system according to claim 23 wherein said main signal circuit is such that said first signal is instantaneously proportional to said input signal.

43. A method of effecting noise reduction for a signal storage or transmission channel wherein an input signal is converted to an output signal, comprising the steps of:

providing a first signal component which, in a specified frequency band, has dynamic range linearity relative to said input signal, providing a second signal component within said band by reducing the dynamic range of a signal derived from said input signal, combining linearly said first and second components so that said second component boosts said first component to produce a third signal, feeding said third signal to said channel and recovering a fourth signal from said channel, providing a fifth signal component which, within said band, has dynamic range linearity relative to said fourth signal, providing a sixth signal component within said band by reducing the dynamic range of a signal derived from said output signal, combining linearly said fifth and sixth components so that said sixth component bucks said fifth component to produce said output signal, the two said dynamic range reducing actions being substantially comparable and the said boosting and bucking actions being in reciprocal proportions.

44. A method of treating a signal for a storage or transmission channel wherein an input signal is converted to an output signal, comprising the steps of providing a first signal component which, in a specified frequency band, has dynamic range linearity relative to said input signal, providing a second signal component within said band by processing a signal derived from said input signal, combining linearly said first and second components to produce a third signal, feeding said third signal to said channel and recovering a fourth signal from said channel, providing a fifth signal component which, within said band, has dynamic range linearity relative to said fourth signal, providing a sixth signal component within said band by processing a signal derived from said output signal, combining linearly said fifth and sixth components to produce said output signal, the two said processing actions being substantially comparable and the said linear combining actions being in opposite senses and reciprocal proportions.

45. A method of compressing an input signal in a specified frequency band to produce an output signal having a decreased dynamic range within at least one restricted part of and specified frequency band, comprising the steps of:

providing a circuit having variable frequency response characteristics over said restricted part of said specified frequency band;

supplying said input signal to said circuit;

deriving a control signal in response to signals in said circuit; and varying said variable frequency response characteristics of said circuit in response to increasing amplitudes of said control signal so as to narrow said restricted part of said specified frequency band.

46. A method in accordance with claim 45 wherein said control signal is derived from a signal appearing in said restricted part of said frequency band, whereby said latter signal is excluded from said narrowed, restricted part of said specified frequency band.

47. A method in accordance with claim 45 and further including the steps of rectifying and smoothing said control signal.

48. A method in accordance with claim 45 wherein said input signal is a carrier signal having one or more sideband signals and further including the steps of:

rejecting said carrier signal; and attenuating said sideband signals.

49. A method in accordance with claim 45 wherein said varying step is in response to increasing amplitudes of said signals in said circuit above a predetermined low level.

50. A method in accordance with claim 49 wherein the predetermined low-level is in the region of an order of magnitude lower, or less than the maximum amplitude of said signals in said circuit.

51. A method of compressing an input signal in a specified frequency band to produce an output signal having a decreased dynamic range within each of a plurality of restricted parts of said specified frequency band, comprising the steps of:

providing a circuit having variable frequency response characteristics over each of said plurality of restricted parts of said specified frequency band;

supplying said input signal to said circuit;

deriving a plurality of control signals each of which is representative of the level of said input signal in a corresponding restricted part of said specified frequency band; and varying the variable frequency response characteristics of said circuit in each of said plurality of restricted parts of said specified frequency band so as to narrow said restricted parts.

52. A method of expanding an input signal in a specified frequency band to produce an output signal having an increased dynamic range within at least one restricted part of said specified frequency band, comprising the steps of:

providing a circuit having variable frequency response characteristics over said restricted part of said specified frequency band;

supplying said input signal to said circuit;

deriving a control signal from a signal appearing in said restricted part of said frequency band;

varying said variable frequency response characteristics of said circuit in response to increasing amplitudes of said control signal so as to narrow said restricted part of said specified frequency band, whereby said signal appearing in said restricted part of said frequency band is excluded from said narrowed, restricted part of said specified frequency band.

53. A method in accordance with claim 52 and further including the steps of rectifying and smoothing said control signal.

54. A method in accordance with claim 52 wherein said input signal is a carrier signal having one or more sideband signals and further including the steps of:

rejecting said carrier signal; and attenuating said sideband signals.

55. A method of expanding an input signal in a specified frequency band to produce an output signal having an increased dynamic range within each of a plurality of restricted parts of said specified frequency band, comprising the steps of:

providing a circuit having variable frequency response characteristics over each of said plurality of restricted parts of said specified frequency band;

supplying said input signal to said circuit;

deriving a plurality of control signals each of which is representative of the level of said input signal in a corresponding restricted part of said specified frequency band; and varying the variable frequency response characteristics of said circuit in each of said plurality of restricted parts of said specified frequency band.

56. A method of effecting noise reduction by compressing a first input signal in a specified frequency band to produce a first output signal having a decreased dynamic range within a least one restricted part of said specified frequency band, transmitting and receiving or recording and playing back said first output signal to provide a second input signal, and expanding said second input signal in said specified frequency band to produce a second output signal having an increased dynamic range within at least one restricted part of said specified frequency band, said compressing comprising the steps of:

providing a circuit having variable frequency response characteristics over said restricted part of said specified frequency band;

supplying said input signal to said circuit;

deriving a control signal in response to signals in said circuit; and varying said variable frequency response characteristics of said circuit in response to increasing amplitudes of said control signal so as to narrow said restricted part of said specified frequency band, and said expanding likewise comprising the steps of:

providing a circuit having variable frequency response characteristics over said restricted part of said specified frequency band;

supplying said input signal to said circuit;

deriving a control signal in response to signals in said circuit; and varying said variable frequency response characteristics of said circuit in response to increasing amplitudes of said control signal so as to narrow said restricted part of said specified frequency band.

57. A method according to claim 56 wherein the said first output signal is recorded and played back to provide said second input signal, and wherein the compressing and the expanding are effected by the same circuit switched to a compression configuration for compressing said first input signal and to an expansion configuration for expanding said second input signal.

58. A method according to claim 56 wherein said control signal for compressing and said control signal for expanding are each derived from a signal appearing in said restricted part of said frequency band, whereby said latter signal is excluded from said narrowed, restricted part of said specified frequency band.

59. A method in accordance with claim 56 wherein said first input signal is a carrier signal having one or more sideband signals and said compressing and expanding each further including the steps of:

rejecting said carrier signal; and attenuating said sideband signals.

60. A method according to claim 56 wherein each of said circuits provided for compressing and expanding has variable frequency response characteristics over each of a plurality of restricted parts of said specified frequency band;

and wherein, in each of said compressing and expanding a plurality of control signals are derived, each of which is representative of the level of said first input signal for compressing and said second input signal for expanding in a corresponding restricted part of said specified frequency band;

and wherein the variable frequency response characteristics of each said circuit are varied in each of said plurality of restricted parts of said specified frequency band in response to increasing amplitudes of said plurality of control signals so as to narrow each of said restricted parts of said specified frequency band.

61. A method in accordance with claim 56 wherein said varying steps are in response to increasing amplitudes of said signals in said circuit above a predetermined low level.

62. A method in accordance with claim 61 wherein the predetermined low level is in the region of an order of magnitude lower, or less, than the maximum amplitude of said signals in said circuit.

63. A signal processing system for processing an input signal to and an information signal from an information channel to produce a system output signal substantially identical to said system input signal, said signal processing system comprising:

a main signal circuit for providing a first signal component which, in a specified frequency band, has dynamic range linearity relative to a signal applied to said main signal circuit, a further signal circuit for providing a second signal component within said band having a limited dynamic range relative to the said signal applied to said main signal circuit, means for combining linearly said first and second signal components, and switching means having compressor and expander modes, said switching means being operative in the compressor mode to apply said input signal to said main signal circuit and to cause said combining means to boost said first signal component by said second signal component and to output said boosted first signal component as said information signal, said switching means being operative in the expander mode to apply said information signal to said main signal circuit and to cause said combining means to buck said first signal component by said second signal component and to output said bucked first signal component as said system output signal.

64. A method of treating an input signal $x$ to provide an output signal $z$ comprising the steps of:

operating linearly upon said input signal to provide a first signal component proportional to $x$, operating non-linearly upon said input signal to provide a second signal component $F_1x$ where $F_1$ is a non-linear operator decreasing as $x$ increases, combining said first and second signal components additively to provide an intermediate signal $y = (1 + F_1)x$, transmitting and receiving or recording and playing back said intermediate signal, operating linearly upon said intermediate signal as received or played back to provide a third signal component proportional to $y$, operating non-linearly upon said output signal to provide a fourth signal component $F_2z$ where $F_2$ is a non-linear operator at least substantially the same as $F_1$, and combining said third and fourth signal components subtractively to provide said output signal $z = y - F_2z$, whereby $z = (1 + F_1)x/(1 + F_2)$.

65. A method according to claim 64 wherein said intermediate signal is recorded and played back, said input signal is operated upon by a circuit having a transfer characteristic $F_1$ to provide said second signal component, and said output signal is operated upon by the same said circuit to provide said fourth signal component, whereby $F_2$ identically equals $F_1$.

66. A signal processing system according to claim 21 wherein the said main and further signal circuits are parallel signal paths.

67. A signal processing system according to claim 21 wherein said first signal is instantaneously proportional to said input signal.

68. A signal processing system according to claim 21 wherein said input signal comprises high frequency audio signals.

69. A signal processing system according to claim 21 wherein said input signal comprises a low frequency audio signal.

70. A signal processing system according to claim 21 wherein said input signal comprises both low frequency and high frequency audio signals.

71. A signal processing system according to claim 21 wherein said input signal comprises high frequency video signals.

* * * * *

UNITED STATES PATENT OFFICE

CERTIFICATE OF CORRECTION

PATENT NO. : 3,846,719

DATED : November 5, 1974

INVENTOR(S) : Ray Milton Dolby

It is certified that error appears in the above-identified patent and that said Letters Patent are hereby corrected as shown below:

Column 3, line 7, change "narroww" to --narrow--.

Column 5, line 24, change "pas" to --pass--.

Column 7, line 29, change "negligable" to --negligible--.

Column 9, line 10, change "FIG. 18" to --FIG. 9--.

Column 13, line 57, change "or" to --for--.

Column 14, line 14, after "wherein" insert --said--;
lines 46 and 47, change "combining additively" to --so combining linearly--;
line 48, after "first signal" insert --that said second signal boosts said first signal--.

Column 15, lines 17 and 18, change "combining subtractively" to --so combining linearly--;
line 19, after "first signal" insert --that said second signal bucks said first signal--;
line 34, change "characteristic" to --characteristics-
line 51, change "additively" to --linearly--;
line 52, before "to produce" insert --so that said second component boosts said first component--;
line 54, change "is substantially proportional" to --has dynamic range linearity relative--.

Column 16, line 8, change "subtractively" to --linearly--;
line 9, before "to produce" insert --so that said second component bucks said first component--.

UNITED STATES PATENT OFFICE

CERTIFICATE OF CORRECTION

PATENT NO. : 3,846,719

DATED : November 5, 1974

INVENTOR(S) : Ray Milton Dolby

It is certified that error appears in the above-identified patent and that said Letters Patent are hereby corrected as shown below:

- PAGE 2 -

Column 16, line 11, change "is substantially proportional" to --has dynamic range linearity relative--;
line 18, change "characteristic" to --characteristics--
line 42, change "path" to --circuit--;
line 43, change "effect" to --affect--.

Column 17, line 58, after "rejection" insert --filter--.

Column 18, line 30, change "comrpising" to --comprising--;
line 35, after "signal" insert --component--.

Column 19, line 62, after "signal" insert --having--.

Column 20, line 2, change "path" to --circuit--;
line 21, change "noise reduction" to --signal processing--;
line 55, after "sixth" insert --components so that said sixth component bucks said fifth component to produce said output signal, said sixth--.

Column 21, line 5, change "boosting and bucking" to --increasing and decreasing--.

Column 22, line 10, change "and" to --said--;
line 41, after "less" insert a comma (,)

Signed and Sealed this

*sixth* Day of *January 1976*

[SEAL]

*Attest:*

RUTH C. MASON
*Attesting Officer*

C. MARSHALL DANN
*Commissioner of Patents and Trademarks*